July 21 1925.  L. HAUBERT  1,546,893
POWER DELIVERING ATTACHMENT FOR AUTOMOBILE TRUCKS OR TRACTORS
Filed March 22, 1924   3 Sheets-Sheet 1

Leo Haubert,
INVENTOR

WITNESSES
F. P. Smith
Howard D. Orr

BY E. G. Siggers
ATTORNEY

July 21 1925.
L. HAUBERT
1,546,893
POWER DELIVERING ATTACHMENT FOR AUTOMOBILE TRUCKS OR TRACTORS
Filed March 22, 1924
3 Sheets-Sheet 2
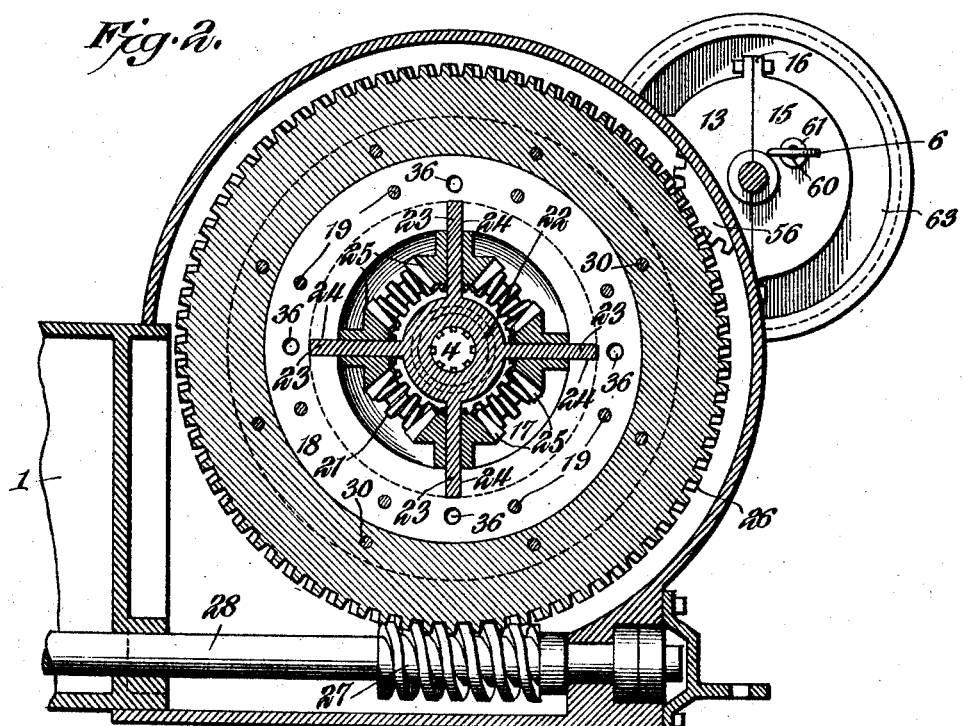
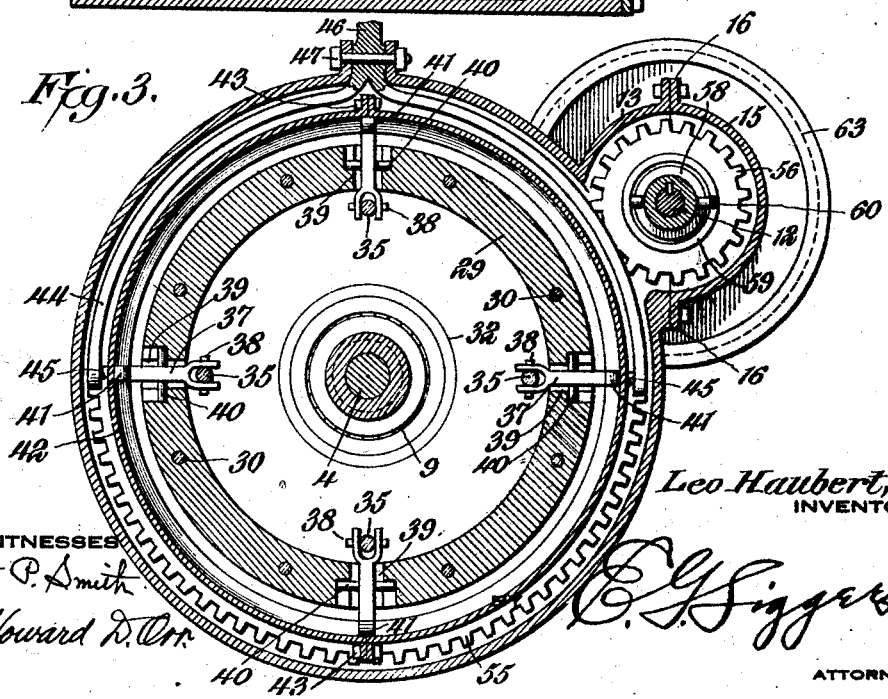

July 21 1925.  1,546,893
L. HAUBERT
POWER DELIVERING ATTACHMENT FOR AUTOMOBILE TRUCKS OR TRACTORS
Filed March 22, 1924  3 Sheets-Sheet 3
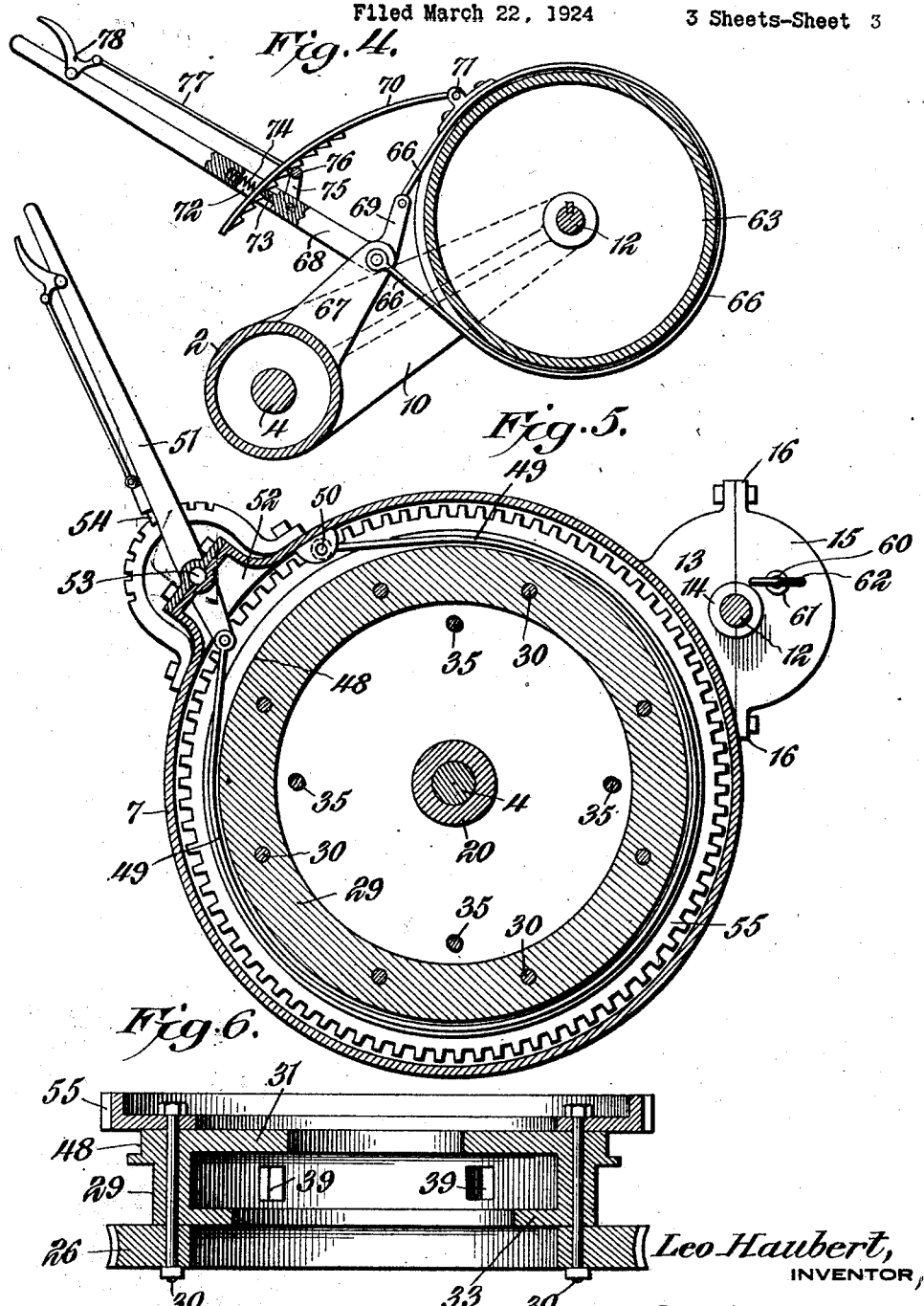
Leo Haubert,
INVENTOR Patented July 21, 1925.

1,546,893

UNITED STATES PATENT OFFICE.

LEO HAUBERT, OF MUSKOGEE, OKLAHOMA, ASSIGNOR OF ONE-THIRD TO JOHN A. WOLFE AND ONE-THIRD TO JOHN CHARLES BENNETT, BOTH OF TULSA, OKLAHOMA.

POWER-DELIVERING ATTACHMENT FOR AUTOMOBILE TRUCKS OR TRACTORS.

Application filed March 22, 1924. Serial No. 701,117.

*To all whom it may concern:*

Be it known that I, LEO HAUBERT, a citizen of the United States, residing at Muskogee, in the county of Muskogee and State of Oklahoma, have invented new and useful Improvements in Power-Delivering Attachments for Automobile Trucks or Tractors, of which the following is a specification.

This invention relates to power delivering attachments for automobile trucks or tractors and is designed to improve the construction disclosed in Patent No. 1,469,002, issued to me September 25, 1923.

The object is to simplify the construction of said device by a re-arrangement of the parts permitting of the elimination of one of the clutch members and the utilization of a single clutch member as well as the elimination of the short shaft members shown therein, thus permitting the use of standard two-piece rear axle shafts.

Another object is to provide a stronger and more durable structure, wherein a more direct drive is imparted to the traction wheels of the truck or tractor, and wherein the power of the motor may be imparted directly to the winding drum shaft for hoisting purposes while the truck or tractor is standing still and not engaged in pulling operations.

A further object is to provide in the attachment, a second brake mechanism which operates directly on the driving mechanism within the axle housings to assist the brake on the drum shaft in lowering a load which may be extra heavy.

A final object is to locate the several operating levers within easy reach of the operator whether in the driver's seat or on the ground, so that he may readily throw in or out the clutch mechanism within the axle housing for directing the power to the traction wheels, or to the drum shaft, or for applying the aforesaid additional brake therein, or for shifting the spur gear on the drum shaft to connect the latter with the coacting gearing and to apply the brake on said drum shaft.

A full and complete understanding of the invention may be obtained from a consideration of the following detailed description, taken in connection with the accompanying drawings forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 2 is a vertical section through the mechanism and taken on the line 2—2 of Figure 1.

Figure 3 is a similar view, taken on the line 3—3 of Figure 1.

Figure 4 is a similar view, taken on the line 4—4 of Figure 1.

Figure 5 is a similar view, taken on the line 5—5 of Figure 1.

Figure 6 is a detail sectional view of the clutch body member together with the spur gear and worm wheel attached thereto.

Figure 1:
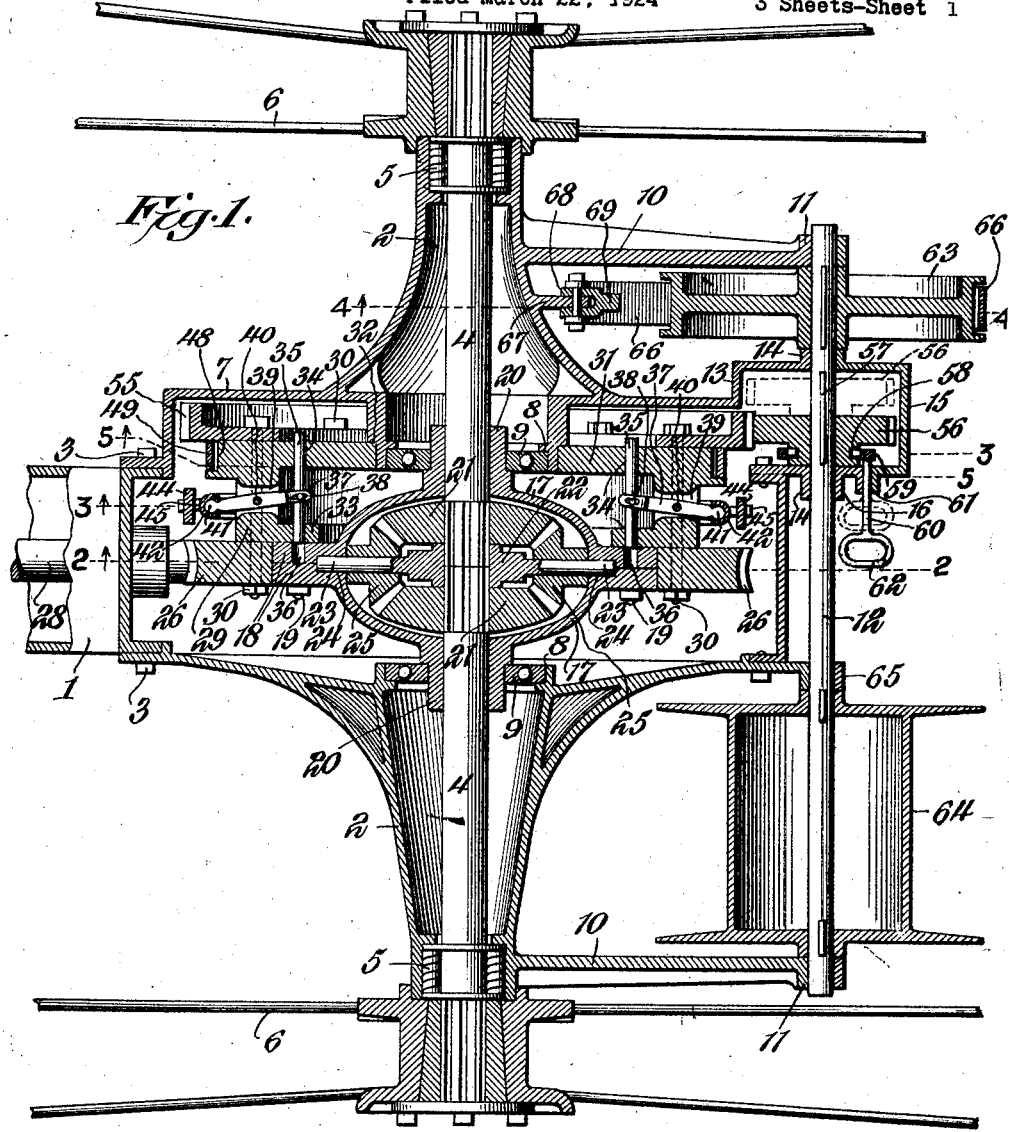
Figure 1 is a horizontal sectional view through the rear axle structure of an ordinary tractor and showing the improvements in connection therewith.

The double value and advantage of a truck or tractor which may be used to haul loads and for hoisting purposes has been well established in oil fields and in large, open areas where farming is done on a large scale, and the demand for such machines has prompted the improvements of the present application, which may be applied to the ordinary truck or tractor with a minimum amount of change in the ordinary structure thereof, and which is confined to a small area within the axle housings of the machine so as not to interfere with the operation of the differential mechanism to allow the proper traction of the wheels when the machine is engaged in hauling, and which may be easily and quickly shifted to direct the power to the winding drum, as when the machine is engaged in hoisting or lowering well casings, rods, tubing etc., into an oil well, or in similar operations.

Referring to drawings, there is shown the rear portion of the transmission housing 1 which forms the trunk of an ordinary tractor, it being deemed unecessary to illustrate the improvements in connection with an automobile truck. The trunk or housing 1 is connected to the inner, enlarged heads of tapered axle housings 2, through the medium of bolts 3, the said housings being oppositely disposed and adapted to house and support longitudinally alined axle members 4, which are placed end to end with their inner ends abutting, and their outer ends supported in anti-friction rollers 5, mounted in the outer, reduced ends of the housings 2 and extended therebeyond where they carry the usual traction wheels 6 in the usual manner.

The axle housings 2 are somewhat dissimilar, as seen in Figure 1 of the drawings, the right hand housing which may be formed of two separate sections, being provided at its inner, enlarged end with a circular drum or enlargement 7, having a peripheral flange through which the aforesaid bolts 3 pass, while the left hand housing 2 merges directly into a similar flange and is not provided with a drum or enlargement.

Each of the housings 2 is provided with a circular, inwardly directed collar 8 for the reception of antifriction members 9, which may be of any well known type, and each of the said housings is also provided adjacent to its outer end, with a rearwardly and upwardly extending arm 10, formed integrally therewith and provided at its free end with a bearing 11 for the reception of the end portions of a drum shaft 12.

The drum portion 7 of the right hand housing 2 is provided with a semi-circular housing 13, concentric with the axis of the drum shaft 12, and provided with a central bearing portion 14 in each side wall of the housing for the reception of said shaft. A semi-circular cover plate 15 is adapted to complete the housing and is provided with coacting bearing portions and suitable flanges 16 for bolting the cover in place.

Figure 7:
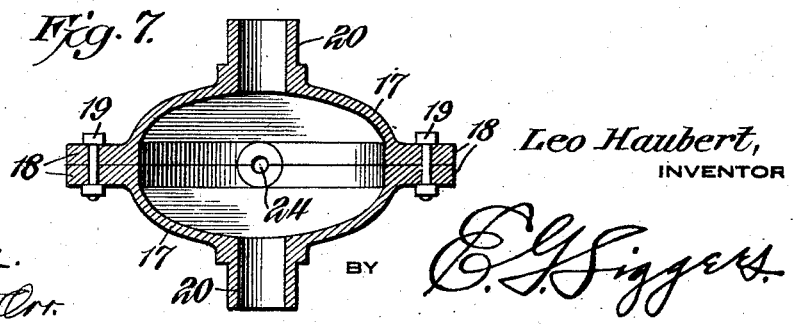
Figure 7 is a detail sectional view of the differential housing.

A differential housing composed of two equal, semi-oval members 17, is located within the axle housings and embraces the abutting ends of the axles 4, the said housing members having peripheral flanges 18 which are connected together by bolts 19 (see Fig. 7), and also provided with central sleeves 20 extending through the aforesaid antifriction members 9, the inner ring of such member being seated against a shoulder formed on the sleeves, so that any longitudinal movement of the differential housing along the axle is prevented.

The inner ends of the axles 4 carry each a bevel gear 21 suitably secured thereto, and between said gears and straddling the ends of the shafts is a spider 22 having four radially disposed, outwardly extending studs 23, whose outer ends are seated in bearing openings 24 formed in the abutting faces of the members 17. Upon each of the studs 23 there is mounted a differential pinion 25 which acts in a well known manner to allow one of the shafts 4 to turn independently of the other.

A worm wheel, in the form of a ring 26 is adapted to bear on and to rotate around the peripheries of the flanges 18, and is driven by a worm 27 mounted on a shaft extension 28 which, through suitable selective gearing (not shown) is driven by the motor.

A clutch body member in the form of a ring 29 is secured to the righthand side of the worm gear ring 26 by means of bolts 30, or in any other suitable manner, said body member extending partly into the aforesaid drum or enlargement 7, and there provided with an integral face plate or wall 31, provided with a suitable, central opening which rests on a seat 32 formed on the exterior of the adjacent inwardly extending collars 8, and is free to revolve around the same as a bearing.

The opposite or inner side of the ring 29, where abutting against the worm ring 26, is provided with an inwardly extending, annular flange 33, formed integrally therewith and overlapping the face of the adjacent flange 18 of the differential housing. This flange, as well as the aforesaid face plate 31 are each provided with alined openings 34, for the reception of longitudinally slidable locking pins 35, which are adapted to be moved into engagement with sockets 36 formed in the face of the adjacent flange 18 of the differential housing. There may be as many locking pins 35 and sockets 36 for the same as desired, there being four shown in the drawings, and it will be seen that when said pins are seated in the sockets 36, the worm ring 26 and clutch ring 29 are locked to the differential housing and rotate the latter in accordance with the power imparted to the worm wheel by the worm 27. In like manner, when the pins are withdrawn from the sockets, the worm wheel and clutch ring and parts carried thereby are free to rotate independently of the differential housing and parts contained therein, so that the truck or tractor may remain stationary while the motor continues to run and to impart motion to the worm wheel and clutch member for other purposes, as will be explained.

In order to shift the locking pins 35 from the exterior of the housing, a rocking lever 37 is pivotally connected at the inner end to each of said pins, the said lever being forked at the end and provided with longitudinal slots for the pivot pin 38 to slide in. The levers 37 are radially disposed with relation to the axles 4 and pass through radial openings 39 formed through the clutch ring or body 29 and are intermediately pivoted therein by pins 40 which are seated in recesses formed in the openings 39 (Fig. 3).

Each lever 37 is provided on its outer end, where extending beyond the outer circumferential face of the body ring 29, with a rounded head 41, which is engaged by a shifting ring 42 extending entirely around the ring 29 in spaced relation thereto, and adapted to be moved bodily in a longitudinal direction to cause the levers 37 to rock and to shift the locking pins into and out of engagement with the sockets 36 (Figs. 1 and 3).

The shifting ring 42 is partially tubular in cross section (as shown in Figure 1), and is thus adapted to properly engage the rounded heads 41 of the levers and to permit their rocking movement, without binding therein, the said ring being formed in two sections having end flanges for the reception of fastening bolts 43 preferably located at the top and the bottom of the ring, as seen in Figure 3.

A shifting yoke 44 straddling the upper half of the ring 42 has pivotal connection with pins 45 of said ring, and is adapted to move the latter in either longitudinal direction, the said yoke having, at the top, an upstanding shifting lever 46 (a portion of which is shown in Figure 3), which extends upwardly through a suitable opening in the housing and is pivotally mounted on a bolt 47 between suitable ears carried exteriorly to the housing. The lever 46 is thus conveniently located for the driver or operator, and may have suitable latch and pawl mechanism (not shown) for holding the same in adjusted position, and it will be seen that by moving the lever in the proper direction, motion may be imparted to the locking pins 35 to either project them into the sockets 36 or to withdraw the same therefrom.

The clutch ring or body 29 is provided with a brake drum 48 at its outer edge, and around which there is passed a brake band 49, one end of which is secured to an ear or ears 50 on the inside of the drum 7 and preferably adjacent to the top thereof, the other end of said band being pivotally connected to the inner end of an actuating lever 51 which projects through an off-set 52 formed near the top of the drum 7. The lever 51 is pivoted at 53 in a suitable bearing formed in the off-set, and is provided with a latch mechanism 54 for holding the same in adjusted position, all of which is clearly shown in Figure 5.

On the outer face of the flange 31 there is held by the bolts 30 a gear ring 55 the teeth of which extend beyond the brake drum 48 and the rear side of said gear ring extends partially into the aforesaid housing 13 through which the drum shaft 12 passes, so that the gear 55 is constantly rotated when the motor is driving the worm 26.

Mounted within the housing 13—15 there is a slidable pinion 56, which is splined on the shaft 12 by a key 57, the said housing being of sufficient width to permit the pinion to be moved longitudinally so as to either engage the gear ring 55 or to be disengaged therefrom, as indicated in dotted lines in Figure 1.

The pinion 56 is provided with a hub extension in which there is formed an annular groove 58, into which are fitted opposite pins of a shifting ring 59 having an extending arm 60 passing through a bearing opening 61 formed in the side of the housing cover 15, and provided with a handle 62 located adjacent to the driver and readily operable to shift the pinion 56 in either direction.

Located between the housing 13—15 and the adjacent arm 10 on the righthand side of the machine, there is a brake drum 63 mounted on and keyed to the drum shaft 12, the hub of said drum bearing on one end against the bearing 11 of the arm, and on the other end against the bearing 14 of said housing; while at the lefthand side of the machine, there is located a winding drum 64, keyed to the shaft 12 and abutting against the outer bearing 11 of the lefthand arm 10 and bearing 65 formed on the attaching flange of the adjacent axle housing 2.

Surrounding the brake drum 63 is a brake band 66 which has its lower end secured to an arm 67, preferably formed integrally with the axle housing member 2 and extending upwardly and rearwardly at an inclination, as clearly shown in Figure 4 of the drawings. Pivotally mounted on the upper end of the arm 67, is a rock lever 68, normally extending forwardly on an incline, and having an upstanding short arm 69, to which is secured the other or upper end of the brake band 66, and it will be seen that by rocking the lever 68 in the proper direction, the band 66 may be either applied to the drum or freed therefrom.

In order to hold the lever 68 in its adjusted position, a toothed, curved arm 70 is pivotally connected at 71 to the upper portion of the brake band 66, and said arm passes through an opening 72 in the lever 68, where one of the teeth thereof is engaged by a projection 73, and such engagement is normally maintained by a coiled spring 74 suitably mounted in the opening 72 and bearing upon the upper side of the toothed arm 70. In order to disengage the arm 70 from the projection 73, a rocking arm 75 is pivotally connected to the lever 68, and is provided with a finger 76 which bears against the underside of the arm 70, and is adapted to be lifted by a pull rod 77 actuated by a latch 78 mounted at the outer end of the lever 68.

When the power of the motor or power unit is imparted to the shaft extension 28 through the usual engine clutch and selective gearing (not shown), the worm wheel 26 together with the clutch member 29 and the gear 55 are rotated thereby, and if the locking pins 35 are withdrawn from the sockets 36, as illustrated in Figure 1, the differential housing remains stationary and consequently the axles and the traction wheels 6, so that the truck or tractor stands still. If now it is desired to perform hoisting operations with the winding drum 64, it is only necessary for the operator to grasp the handle 62 to pull the pinion 56 along the shaft 12 and into meshing relation to the teeth of the gear ring 55, as shown in full lines in said figure, when rotary motion will be imparted to the shaft and drum through the medium of the key or spline 57.

By applying the brake band 66 and shifting the pinion 56 to the dotted line position in Figure 1, or out of engagement with the gear 55, when the load has been hoisted to the desired height, the same may be readily held or lowered when desired, by easing up on the single brake, providing the load is of only average weight, but if an abnormally heavy load is being handled, and it is desired to hold or lower the same, the pinion 56 may be left in engagement with the gear 55, and with the locking pins 35 disconnected from the differential housing, the additional brake band 49 may be brought into action to assist the brake band 66, at which time the power through the shaft extension 28 may be cut off, by means of the aforesaid selective gearing, which may be shifted into neutral, when the two brake mechanisms will serve to safely and properly handle the extra heavy load. The two brakes may also be used in this manner when the machine is travelling down a steep grade.

Since the drive worm 27 is always in engagement with the worm wheel or ring 26, it follows that the latter together with the parts connected therewith will always rotate when the shaft extension 28 is actuated. When the pins 35 are in locked position with the differential housing, the latter is also revolved and the proper driving action is imparted to the wheels 6 to drive the machine either forwardly or to the rear, depending on the direction of drive imparted to the shaft 28. At this time ordinarily, the pinion 56 is not in engagement with the gear 55 and the winding drum is not in action, but as before stated, it is only necessary to disconnect the pins 35 and slide the pinion, in order to have the machine remain stationary and to perform the winding operation.

From the foregoing it is thought the advantages derived from present construction and arrangement of the parts, which has been greatly simplified, will be readily appreciated, and that a strong, durable and efficient power delivering attachment for trucks, tractors, etc., has been provided, whereby the power for driving the vehicle may be readily utilized for hoisting purposes, and that complete control of the machine may be had at all times by the operator.

What is claimed is:—

1. A power delivering attachment for motor vehicles having separate drive axles mounted in axle housings, differential gearing located between and connecting the axles, a drive shaft, a separate drive gear mounted in one axle housing a worm wheel surrounding the differential gearing and adapted to be driven by the drive shaft, said worm wheel and separate drive gear being connected to rotate together, means for connecting the separate gear to the differential gearing or disconnecting the same therefrom, a drum shaft mounted on the housing, and a slidable pinion mounted on said shaft and adapted to be moved into or out of engagement with the separate drive gear to rotate the drum.

2. A power delivering attachment for motor vehicles having separate drive axles mounted in axle housings, differential gearing including a housing located between and connecting the axles, a worm wheel surrounding the differential gearing, a drive shaft having a worm coacting with the worm wheel, a separate gear mounted in one axle housing in spaced relation to the worm wheel and secured to the same to rotate therewith, manually actuated means for locking the worm wheel and separate gear to the differential housing, a drum shaft, and means to drive the drum shaft when the locking means is moved to disconnect the separate gear and worm wheel from the differential housing.

3. A power delivering attachment for motor vehicles having separate drive axles mounted in axle housings, differential gearing including a housing located between and connecting the axles, a worm wheel surrounding the differential gearing, a drive shaft having a worm connected to the worm wheel, a separate gear mounted in one axle housing in spaced relation to the worm wheel and secured to the same to rotate therewith, manually actuated means for locking the worm wheel and gear to the differential housing, a drum shaft mounted on the axle housings, a longitudinally slidable pinion adapted to be meshed with the gear to drive the drum shaft when the locking means is moved to disconnect the gear and worm wheel from the differential housing.

4. A power delivering attachment for motor vehicles having separate drive axles mounted in axle housings, differential gearing including a housing located between and connecting said axles, a worm wheel, a drive shaft having a worm meshing with the worm wheel, a spaced gear wheel rigidly connected to the worm wheel, longitudinally slidable locking pins mounted in the gear to lock the same to the differential housing, a brake drum formed on said gear, means for shifting the locking pins, and means for applying a brake band to said drum.

5. A power delivering attachment for motor vehicles having separate drive axles, differential gearing located between and connecting said axles, axle housings surrounding the axles, a differential housing surrounding the differential gearing therein, said differential housing having anti-friction bearings at each end within the axle housings, a worm wheel surrounding and having a bearing around the differential housing, a drive shaft having a worm meshing with the worm wheel, a spaced gear wheel rigidly connected to the worm wheel and having a bearing within one axle housing, longitudinally slidable locking pins mounted in the gear to lock the same to the differential housing, a brake drum formed on said gear, means for shifting the locking pins from the exterior of the axle housings, and means for applying a brake band to said drum.

6. A power delivering attachment for motor vehicles having separate drive axles mounted in axle housings, differential gearing located between and connecting the axles and having a housing mounted in anti-friction bearings within the axle housings, a combined worm wheel, brake drum and gear wheel mounted between the axle housings and having a bearing at the inner end on the differential housing and at the outer end within one of the said axle housings, a drive shaft having a worm meshing with the worm wheel to rotate the combination member, means for locking the said member to the differential housing, a brake band surrounding said brake drum, separate means mounted exteriorly of the axle housing for applying the brake band and for shifting the locking means, a drum shaft carried in rear of the axle housings, a winding drum mounted on the said shaft, a separate brake drum carried by the same shaft and surrounded by a brake band, separate means for applying the same, a shiftable pinion mounted on the drum shaft, and means for sliding said pinion into mesh with the gear wheel of the combined member to wind a cable on the drum when the combined member is disengaged from the differential housing.

7. A power delivering attachment for motor vehicles having separate drive axles, differential gearing located between and connecting said axles, axle housings surrounding the axles, a central casing connecting the axle housings, a worm drive located in the central casing, a connected gear wheel, brake drum and worm wheel mounted between the axle housings and adapted to be driven at all times by said worm drive, a housing surrounding the differential gearing and having a series of sockets, a series of longitudinally slidable pins mounted in the combined member, levers mounted in the same and connected to the pins, a ring engaging the outer ends of the levers, and means for shifting the ring longitudinally to rock the levers and project the pins into the sockets to cause the combined member to turn with the differential.

8. A power delivering attachment for motor vehicles having separate drive axles, differential gearing located between and connecting said axles, axle housings surrounding the axles, a central casing connecting the axle housings, a housing surrounding the differential, a combined gear wheel, brake drum and worm wheel mounted between the axle housings and within the central casing, a drive worm for rotating the combined member, means for connecting or disconnecting the said combined member and the differential housing, a drum shaft having a drum and mounted in rear of the axle housings, and means adapted to be connected with the gear of the combined member to wind the drum when the said member is disconnected from the differential housing.

9. A power delivering attachment for motor vehicles having separate drive axles, differential gearing located between and connecting said axles, axle housings surrounding the axles, a housing surrounding the differential gearing and mounted for rotation in anti-friction bearings, a worm wheel having bearing around said housing and carrying a gear wheel, means for driving the worm wheel and gear, means for locking the worm wheel and gear to the differential housing, a drum shaft mounted on the axle housings, a pinion splined on said shaft, and means for shifting the pinion into mesh with the gear of the combined worm wheel and gear to drive the drum shaft when the said worm and gear are disconnected from the differential housing.

In testimony, that I claim the foregoing as my own, I have hereto affixed my signature.

LEO HAUBERT.